(No Model.)

G. PEACOCK.
HUB FOR CAR WHEELS.

No. 293,071. Patented Feb. 5, 1884.

WITNESSES
Edwin L. Yewell.
J. J. McCarthy.

INVENTOR
George Peacock
By C. M. Alexander,
Attorney

UNITED STATES PATENT OFFICE.

GEORGE PEACOCK, OF SELMA, ALABAMA.

HUB FOR CAR-WHEELS.

SPECIFICATION forming part of Letters Patent No. 292,071, dated February 5, 1884.

Application filed December 14, 1883. (No model.)

*To all whom it may concern:*

Be it known that I, GEORGE PEACOCK, a citizen of the United States, residing at Selma, in the county of Dallas and State of Alabama, have invented certain new and useful Improvements in Hubs, of which the following is a specification, reference being had therein to the accompanying drawings.

My invention relates to metallic hubs and boxes for cast wheels, one object being to form a hub in such manner that it can be cast without danger of breaking by contraction when cooling, and another being to so construct the hub and box that they may be fitted and secured together in a true and substantial manner for forming an entire wheel.

Figure 1:
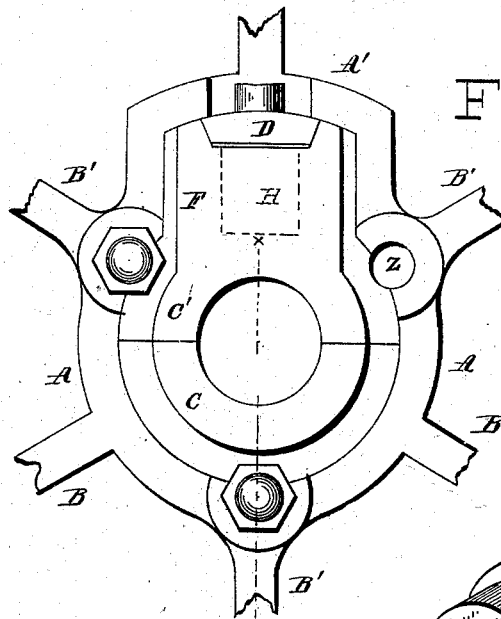
Figure 2:
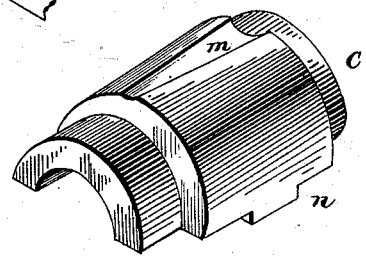
Figure 4:
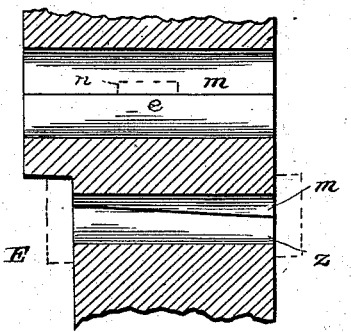
Figure 3:
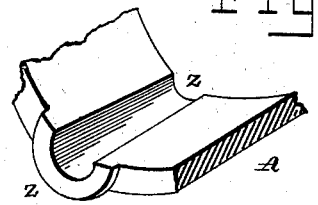
Figures 5, 6:
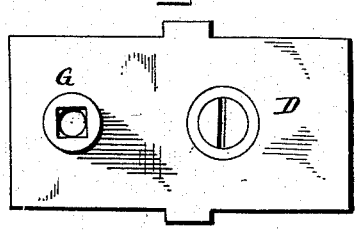

In the accompanying drawings, which make part of this specification, Figure 1 represents a side view of the wheel and hub, the spokes being cut away near the hub. Figs. 2 and 5 are perspectives of portions of the box. Fig. 3 is a perspective view of a portion of the hub. Fig. 4 is a longitudinal section of a portion of the hub and box, taken on the line $x\,x$, Fig. 1; and Fig. 6 is a plan view of the top which covers an oil-chamber in the box.

In the figures, A represents a rim or skeleton hub having its spokes B B' cast with and upon it. This hub, when used for tram-wheels or pulleys or other similar purposes, is cast about one-half inch in thickness, and this thickness is preserved and as uniform throughout as it is possible to make it, so that in cooling it will cool with uniformity, and thus not be subject to crack or breakage from the contraction of one part more suddenly than that of another. This construction enables me also to chill the metal, and thus prepare it for hard and long use. The inner surface of the hub has a decided taper from one end to the other, the object of which will be hereinafter stated.

It will be seen in Fig. 1 that the ends of the spokes B' B' are enlarged at their junction with the hub. This is for the purpose of preserving a uniform thickness of the hub after longitudinal bolt-holes have been made in it.

$z$ represents one of these openings, as seen in Figs. 1 and 3. They are made larger at one end than at the other, and tapering with reference to the surfaces in which they are made, but are parallel with a line drawn through the center of the hub. The object in making these openings in this manner is to allow the bolts which secure the box to the hub to pass through in a straight line. The hub is enlarged at one side, as seen at A'. This enlargement is made in order to accommodate an oil-reservoir which is formed upon one part of the box.

C and C' represent the two parts of a box, which are fitted within the hub A. One portion of this box is provided with an enlargement, F, which extends into the enlargement A' of the hub. The exterior surface of the box is made on a taper to correspond with that of the interior of hub, and is provided with grooves or openings $m$, which are of shape similar to those in the hub, and come opposite to them when the box is introduced in the hub. Bolts E (seen in dotted line, Fig. 4) pass into these openings, and the head of the bolts pressing against the end of the hub, and the nuts pressing against one end of the box, the box is forced or drawn into the hub, and there retained by the said bolts.

In order to keep the two parts of the box together and from slipping endwise, I provide lugs $n$ on one part, which fit into recesses $e$ on the other part, thus holding the two almost as securely as if cast in one piece.

D represents the top, provided to close an opening in the oil-reservoir. A hollow valve plug, G, extends through the top D. The oil may be carried through this plug to the reservoir, and a valve on it prevents escape. Stuffed cups on the inside of the reservoir allow oil to escape gradually through ducts in the bottom to the axle.

In Fig. 4 the openings $e$ and $m$ are seen opposite each other, with the bolt in dotted lines, passing in to secure the hub and box together.

In the old way of casting the hub and box in one piece the thickness of the parts was so great that in the process of cooling contraction would be so unequal as to frequently cause breakage of some of the parts, and thus destroy the work. This box may be cast in cylindrical shape, tapering on its outside, with an oil-reservoir in its body, and then the shape of the hub would be made to correspond with it.

The exterior of the box and the interior of the hub being formed so that they exactly or very closely correspond, the two when drawn together by bolts are about as firmly united as if the two were cast in one piece, but at any rate answer all practical purposes.

Having thus fully described my invention, what I claim, and desire to secure by Letters Patent, is—

1. A skeleton hub cast with tapering external surface and of uniform thickness, and with an enlargement and bolt openings, in combination with a box constructed in two parts, one having an enlargement adapted to fit in the enlargement in the hub and containing an oil-reservoir communicating with the interior by means of suitable ducts, the parts being provided with bolt-openings corresponding to those of the hub, the whole being secured together by means of bolts, substantially as specified.

2. The combination, with the skeleton hub, of the box constructed in two parts and provided with interlocking lugs and recesses, the hub and box being provided with bolt-holes for the reception of bolts for securing the parts together, substantially as specified.

In testimony whereof I affix my signature in presence of two witnesses.

GEORGE PEACOCK.

Witnesses:
C. M. ALEXANDER,
CHAS. D. DAVIS.